US009650980B2

(12) United States Patent
Wirkowski et al.

(10) Patent No.: US 9,650,980 B2
(45) Date of Patent: May 16, 2017

(54) METHOD AND DEVICE FOR CONTROLLING A VALVE

(71) Applicant: Continental Automotive GmbH, Hannover (DE)

(72) Inventors: Michael Wirkowski, Regensburg (DE); Christian Mey, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 16 days.

(21) Appl. No.: 14/434,654

(22) PCT Filed: Oct. 4, 2013

(86) PCT No.: PCT/EP2013/070703

§ 371 (c)(1),
(2) Date: Apr. 9, 2015

(87) PCT Pub. No.: WO2014/056797

PCT Pub. Date: Apr. 17, 2014

(65) Prior Publication Data

US 2015/0263648 A1 Sep. 17, 2015

(30) Foreign Application Priority Data

Oct. 9, 2012 (DE) ........................ 10 2012 218 370

(51) Int. Cl.
*H02P 1/04* (2006.01)
*F02D 41/24* (2006.01)
(Continued)

(52) U.S. Cl.
CPC ..... *F02D 41/2464* (2013.01); *F02D 41/2438* (2013.01); *F02D 41/2441* (2013.01);
(Continued)

(58) Field of Classification Search
CPC ..... F02D 2041/2024; F02D 2041/2027; F02D 41/2429; F02D 41/2438; F02D 41/2464;
(Continued)

(56) References Cited

U.S. PATENT DOCUMENTS 4,680,667 A * 7/1987 Petrie ...................... F02D 41/20 123/490
5,375,575 A * 12/1994 Ohishi ................ F02D 41/0085 123/446
(Continued)

FOREIGN PATENT DOCUMENTS

DE 102007026947 A1 12/2008 ............. F02D 41/20
DE 102009043124 A1 3/2011 ............. F02D 41/00
(Continued)

OTHER PUBLICATIONS

International Search Report and Written Opinion, Application No. PCT/EP2013/070703, 14 pages, Dec. 3, 2013.
(Continued)

*Primary Examiner* — Hung Q Nguyen
*Assistant Examiner* — Kevin R Steckbauer
(74) *Attorney, Agent, or Firm* — Slayden Grubert Beard PLLC

(57) ABSTRACT

A method includes applying a specified starting voltage to a valve actuator in a first specified operating mode for closing the valve, the valve having a spring with a spring force against which an actuator force of the actuator acts. In the first operating mode, a first period of time is ascertained which represents that a maximum current value has been reached. Furthermore, a second period of time is ascertained which represents that a minimum current value has been reached. In a specified second operating mode, the specified starting voltage is applied to the actuator until the end of the first period of time is reached, and a control voltage is then
(Continued)

applied to the actuator until the end of the second period of time is reached, wherein the average value of the control voltage is lower than the average value of the starting voltage.

12 Claims, 2 Drawing Sheets

(51) Int. Cl.

| | |
|---|---|
| ***F02M 59/36*** | (2006.01) |
| ***F02M 63/00*** | (2006.01) |
| ***F02D 41/38*** | (2006.01) |
| *F02D 41/20* | (2006.01) |

(52) U.S. Cl.
CPC ..... *F02D 41/2467* (2013.01); *F02D 41/3863* (2013.01); *F02M 59/368* (2013.01); *F02M 63/0035* (2013.01); *F02D 41/2429* (2013.01); *F02D 2041/2027* (2013.01); *F02D 2041/2041* (2013.01)

(58) Field of Classification Search
CPC .. F02M 59/368; F02M 59/464; F02M 59/468; F02M 63/0012
See application file for complete search history.

(56) References Cited

U.S. PATENT DOCUMENTS

| | | | | |
|---|---|---|---|---|
| 5,947,090 | A * | 9/1999 | Maeda | F02D 41/20 123/490 |
| 5,959,825 | A * | 9/1999 | Harcombe | F02D 41/20 361/152 |
| 6,326,898 | B1 * | 12/2001 | O'Leyar | H01F 7/1844 340/635 |
| 6,332,454 | B1 * | 12/2001 | Itabashi | F02D 41/062 123/490 |
| 6,889,121 | B1 * | 5/2005 | Shahroudi | H01F 7/1805 251/129.18 |
| 7,559,311 | B2 * | 7/2009 | Tanaka | F02D 41/20 123/458 |
| 7,936,549 | B2 * | 5/2011 | Takeuchi | G01R 31/043 335/213 |
| 8,397,697 | B2 * | 3/2013 | Achleitner | F02D 41/20 123/478 |
| 8,823,390 | B2 * | 9/2014 | Keller | F16K 37/0075 324/617 |
| 8,887,560 | B2 * | 11/2014 | Beer | F02D 41/20 73/114.49 |
| 8,960,158 | B2 * | 2/2015 | Beer | F02D 41/20 123/490 |
| 9,261,038 | B2 * | 2/2016 | Nishida | F02D 41/20 |
| 9,322,354 | B2 * | 4/2016 | Nishida | F02D 41/20 |
| 9,412,508 | B2 * | 8/2016 | Koch | F02D 41/20 |
| 2002/0189593 | A1 * | 12/2002 | Yamakado | F02D 41/20 123/490 |
| 2004/0155121 | A1 * | 8/2004 | Watanabe | F02D 41/20 239/533.2 |
| 2006/0285265 | A1 * | 12/2006 | Ganev | H01F 7/1844 361/160 |
| 2007/0222427 | A1 * | 9/2007 | Takeuchi | G01R 31/043 324/71.2 |
| 2008/0087254 | A1 * | 4/2008 | Tanaka | F02D 41/20 123/472 |
| 2010/0192914 | A1 * | 8/2010 | Achleitner | F02D 41/20 123/478 |
| 2010/0237266 | A1 * | 9/2010 | Haaf | F02D 41/20 251/129.15 |
| 2012/0185147 | A1 * | 7/2012 | Beer | F02D 41/20 701/102 |
| 2012/0283883 | A1 | 11/2012 | Wilms et al. | 700/282 |
| 2012/0319700 | A1 * | 12/2012 | Keller | F16K 37/0075 324/617 |
| 2013/0104636 | A1 * | 5/2013 | Beer | F02D 41/20 73/114.49 |
| 2013/0112172 | A1 * | 5/2013 | Toyohara | F02D 41/345 123/478 |
| 2013/0226488 | A1 | 8/2013 | Wirkowski et al. | 702/64 |
| 2014/0067233 | A1 * | 3/2014 | Nishida | F02D 41/20 701/103 |
| 2014/0069390 | A1 * | 3/2014 | Nishimura | F02D 41/20 123/478 |
| 2014/0092516 | A1 * | 4/2014 | Koch | F02D 41/20 361/160 |
| 2014/0109875 | A1 * | 4/2014 | Lachaize | F02D 41/20 123/456 |
| 2014/0316679 | A1 * | 10/2014 | Nishida | F02D 41/20 701/104 |
| 2015/0128912 | A1 * | 5/2015 | Nishida | F02D 41/20 123/480 |
| 2016/0160784 | A1 * | 6/2016 | Denk | F02D 41/20 701/105 |
| 2016/0177855 | A1 * | 6/2016 | Kusakabe | F02D 41/20 123/490 |
| 2016/0281624 | A1 * | 9/2016 | Dames | F02D 41/40 |

FOREIGN PATENT DOCUMENTS

| | | | | |
|---|---|---|---|---|
| DE | 102009046783 A1 | | 5/2011 | F02D 41/38 |
| DE | 102010039832 A1 | | 3/2012 | F16K 31/02 |
| DE | 102011005672 A1 | | 9/2012 | F02D 41/20 |
| DE | WO 2012123445 A1 | * | 9/2012 | F02D 41/20 |
| EP | 0563760 A2 | | 10/1993 | F02D 41/00 |
| WO | 2014/056797 A1 | | 4/2014 | F02D 41/24 |

OTHER PUBLICATIONS

Chinese Office Action, Application No. 201380052881.5, 13 pages, Aug. 30, 2016.

* cited by examiner

METHOD AND DEVICE FOR CONTROLLING A VALVE

CROSS-REFERENCE TO RELATED APPLICATIONS

This application is a U.S. National Stage Application of International Application No. PCT/EP2013/070703 filed Oct. 4, 2013, which designates the United States of America, and claims priority to DE Application No. 10 2012 218 370.1 filed Oct. 9, 2012, the contents of which are hereby incorporated by reference in their entirety.

TECHNICAL FIELD

The invention relates to a method and a device for controlling a valve.

BACKGROUND

A valve of this kind is used, for example, in a high-pressure pump for delivering fluid for an accumulator-type injection system for internal combustion engines of motor vehicles.

Valves of this kind are subjected to intense stresses, in particular if they are subjected to continuous loading such as is the case in high-pressure pumps for example. Since high-pressure pumps are subjected to pressures of, for example, 2000 bar and more in diesel internal combustion engines, high demands are placed on the valves in pumps of this kind.

SUMMARY

One embodiment provides a method for controlling a valve which has a spring with a spring force and an actuator with an actuator force which counteracts the spring force, in which method for the purpose of closing the valve in a predefined first operating mode, a predefined starting voltage is applied to the actuator, a maximum current value is determined, said maximum current value representing a current peak of a current which is impressed by the applied starting voltage, a first time period is determined, said first time period being representative of the time which has passed between the starting voltage being applied and the maximum current value being reached, a minimum current value is determined, said minimum current value representing a local minimum of the impressed current, wherein the minimum current value follows the maximum current value, a second time period is determined, said second time period being representative of the time which has passed between the starting voltage being applied and the minimum current value being reached, for the purpose of closing the valve in a predefined second operating mode, the predefined starting voltage is applied to the actuator, specifically for the determined first time period, and then, after the first time period until the end of the second time period, the current which is impressed onto the actuator is adjusted by means of a predefined control voltage, wherein the average value of the control voltage is lower than the average value of the starting voltage.

In a further embodiment, the control voltage is determined depending on the determined first time period and/or on the determined second time period.

In a further embodiment, the current of the actuator is adjusted by means of the control voltage, after the first time period until the end of the second time period, in such a way that it corresponds approximately to a predefined lower limit value at the end of the second time period.

In a further embodiment, the current is adjusted by means of a freewheeling phase after the first time period until the end of the second time period, the control voltage being zero and the current being adjusted by a freewheel in said freewheeling phase.

In a further embodiment, the control voltage is adjusted by means of pulse-width modulation after the first time period until the end of the second time period.

In a further embodiment, the valve is arranged in a high-pressure pump in the form of an inlet valve.

Another embodiment provides a device for controlling a valve which has a spring with a spring force and an actuator with an actuator force which counteracts the spring force, wherein the device is designed to: determine a maximum current value which represents a current peak of a current which is impressed by an applied starting voltage, determine a first time period which is representative of the time which has passed between the starting voltage being applied and the maximum current value being reached, determine a minimum current value which represents a local minimum of the impressed current, wherein the minimum current value follows the maximum current value, determine a second time period which is representative of the time which has passed between the starting voltage being applied and the minimum current value being reached, and apply the predefined starting voltage to the actuator, specifically for the determined first time period, and then, after the first time period until the end of the second time period, adjust the current which is impressed onto the actuator by means of a predefined control voltage, wherein the average value of the control voltage is lower than the average value of the starting voltage.

BRIEF DESCRIPTION OF THE DRAWINGS

Example embodiments of the invention are explained in greater detail below with reference to the schematic drawings, in which.

DETAILED DESCRIPTION

Figure 1:
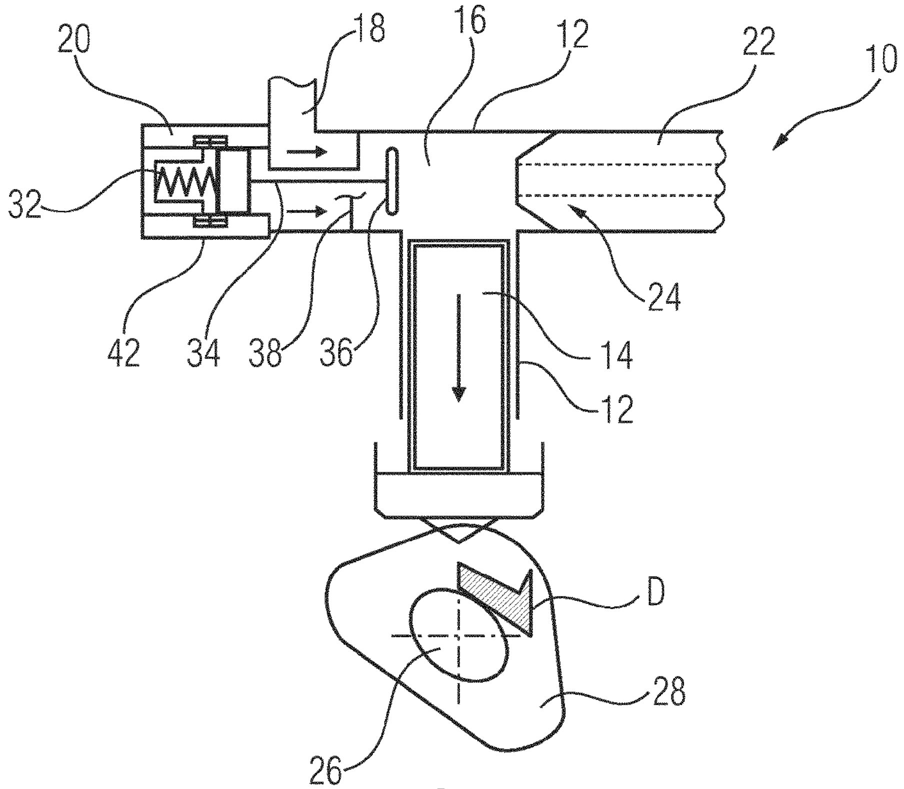
FIG. 1 shows a longitudinal section through a pump having a valve.

Embodiments of the invention provide a method and a corresponding device that permit precise operation of a valve.

Some embodiments provide a method and by a corresponding device for controlling a valve. The valve has a spring with a spring force and an actuator with an actuator force which counteracts the spring force. In a predefined first operating mode, a predefined starting voltage is applied to the actuator for the purpose of closing the valve. A maximum current value is also determined, said maximum current value representing a current peak of a current which is impressed by the applied starting voltage. A first time period is determined, said first time period being representative of the time which has passed between the starting voltage being applied and the maximum current value being reached. A minimum current value is determined, said minimum current value representing a local minimum of the impressed current. The minimum current value follows the maximum current value. A second time period is determined, said second time period being representative of the time which has passed between the starting voltage being applied and the minimum current value being reached. In a predefined second operating mode, the predefined starting voltage is applied to the actuator for the purpose of closing the valve. The starting voltage is applied for the determined first time period. Then, after the first time period until the end of the second time period, the current which is impressed onto the actuator is adjusted by means of a predefined control voltage. The average value of the control voltage is lower than the average value of the starting voltage. Important information for the valve, such as the closing period of the valve for example, is obtained in the first operating mode. This information is used in order to drive the valve in the second operating mode. As a result, it is possible for the valve to be precisely driven. In addition, the power consumption by the valve may possibly be reduced compared to conventional driving, and as a result the service life of the valve may increase and further positive side effects, such as reduced noise production by the valve during closing, may possibly additionally be achieved too.

According to one embodiment, the control voltage is determined depending on the determined first time period and/or on the determined second time period. As a result, it is possible to drive the valve effectively since it is possible to react to the properties of the valve, such as the closing period for example, by means of adjusting the control voltage.

According to a further embodiment, the current which is impressed onto the actuator is adjusted by means of the control voltage, after the first time period until the end of the second time period, in such a way that it corresponds approximately to a predefined lower limit value at the end of the second time period. For example, the lower limit value is a value at which it is possible to ensure that the valve is closed. As a result, the power consumption may possibly be reduced.

According to a further embodiment, the impressed current is adjusted by means of a freewheeling phase after the first time period until the end of the second time period, the control voltage being zero in said freewheeling phase and the current being adjusted by a freewheel in said freewheeling phase. As a result, the power consumption is possibly further reduced.

According to a further embodiment, the control voltage is adjusted by means of pulse-width modulation after the first time period until the end of the second time period. As a result, the control voltage is adjusted in a simple manner.

According to a further embodiment, the valve is arranged in a high-pressure pump in the form of an inlet valve.

Elements which have the same structure or function are identified by the same reference symbols throughout the figures.

FIG. 1 shows a pump 10 having a pump housing 12. The pump 10 is in the form of a high-pressure pump in particular, preferably in the form of a radial piston pump. A pump piston 14 is movably mounted in the pump housing 12. A pressure chamber 16 is located at one end of the pump piston 14 in the pump housing 12. In order to be able to fill the pressure chamber 16 with fluid, said pressure chamber has an inflow line 18 in which a valve 20, which is in the form of an inlet valve, is preferably arranged. The valve 20 is preferably in the form of a digitally switched valve. The valve 20 facilitates filling of the pressure chamber 16 and prevents the fluid from flowing back out of the inflow line 18 during filling. The pressure chamber 16 further has an outflow line 22 in which a further valve 24, which is in the form of an outlet valve, is arranged. Therefore, fluid can be expelled from the pressure chamber 16.

The pump 10 further has a drive shaft 26 which is operatively connected to a cam-like body 28 which predefines a cam-like profile to the pump piston 14 and can be rotated, for example clockwise, in a rotation direction D. Instead of the cam-like body 28, an eccentric ring or a camshaft can also be used for example, and, as an alternative, the pump 10 can also be designed as a crank drive pump.

Figure 2:
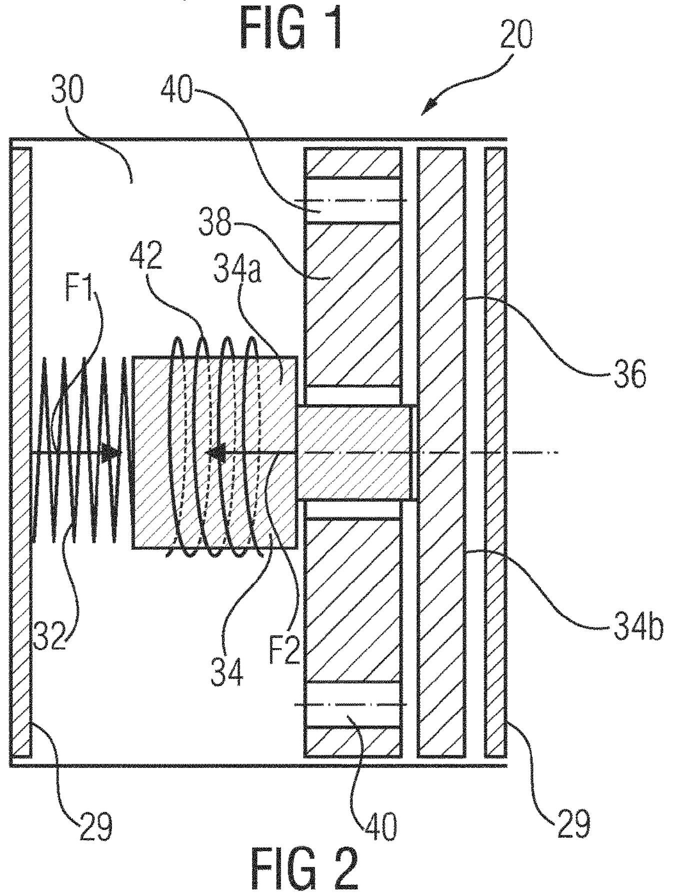
FIG. 2 shows a longitudinal section through the valve.

FIG. 2 shows the valve 20 having a valve housing 29 which has a recess 30. A spring 32, a pin 34 and a sealing element 36 are arranged in the recess 30. The spring 32 is arranged between a wall of the recess 30 and the pin 34. As a result, a spring force F_1, which is generated by the spring 32, acts on the pin 34, as a result of which the sealing element 36 is prestressed by means of the pin 34. The pin 34 has a first cylindrical part 34*a* and a second cylindrical part 34*b*, wherein the first part 34*a* has a larger diameter than the second part 34*b*.

The recess 30 further contains a sealing seat 38 which is fixedly arranged with respect to the valve housing 29 and which has cutouts 40. Fluid can flow via the cutouts 40 if the sealing element 36 is not bearing against the sealing seat 38.

The manner of operation of the pump 10 and of the valve 20 will be described in the text which follows:

As a result of a rotary movement of the drive shaft 26 in the rotation direction D, the pump piston 14 is moved toward the drive shaft 26 by means of the cam-like body 28 until said pump piston reaches a bottom dead center. The pressure in the pressure chamber 36 is reduced as a result of this movement. This results in a change in the forces which act on the valve and the valve 20 ultimately opens on account of the spring force F_1 of the spring 32 and the pressure difference between the inflow line 18 and the pressure chamber 36. The sealing element 36 lifts away from the sealing seat 38. This time at which the sealing element 36 lifts away from the sealing seat 38 is called the natural opening time.

When a valve 20 is open, the pressure chamber 16 is filled with fluid. As a result of a further rotary movement of the drive shaft 26 in the rotation direction D, the pump piston 14 is moved away from the drive shaft 26 by the cam-like body 28 and in the process compresses the fluid which is contained in the pressure chamber 16. At a predefined time, an actuator force F_2, which counteracts the spring force F_1, acts on the pin 34 as a result of a voltage being applied to the actuator 42. The pin 34 moves in the direction of the actuator force F_2 on account of the actuator force F_2 and the pressure difference between the pressure chamber 36 and the inflow line 18. As a result, the sealing element 36 bears against the sealing seat 38 and fluid is prevented from flowing through the cutouts 40. The valve 20 is closed in this way. The fluid which is compressed in the pressure chamber 16 can now be fully expelled from the pump 10 via the further valve 24, which is in the form of an outlet valve.

If the pump 10 is a high-pressure fuel pump of an injection system of an internal combustion engine, the fuel which is subjected to the high pressure can be passed to a fluid reservoir which is in the form of a high-pressure fuel reservoir, the so-called common rail.

Control of the valve 20 for a normally open valve will be illustrated in detail below (FIG. 3*a*, FIG. 4*a*, FIG. 3*b*, FIG. 4*b*). It goes without saying that this can be applied to a normally closed valve in a corresponding manner.

Figure 3A:
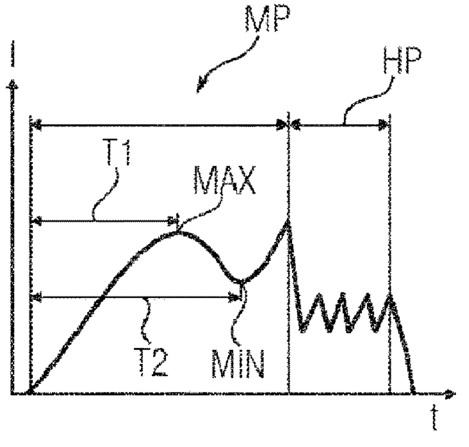
FIG. 3*a* shows a current profile during control of the valve.
Figure 4A:
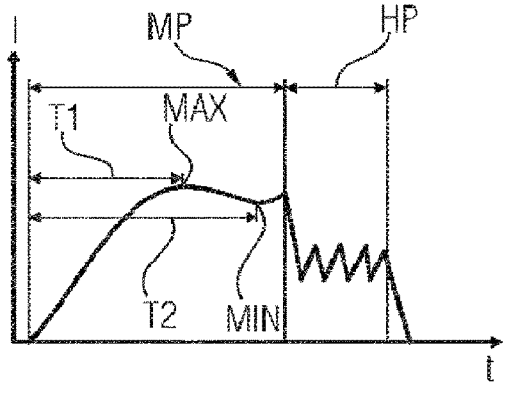
FIG. 4*a* shows a further current profile during control of the valve.

In a predefined first operating mode MP, a predefined starting voltage is applied to the actuator 42 in order to close the valve (FIG. 3*a*, FIG. 4*a*). The first operating mode MP is, for example, a measurement mode which takes place, for example, in an overrun phase. The predefined starting voltage is, for example, the battery voltage, or a voltage which is set, for example, by pulse-width modulation.

A current is impressed onto the actuator 42 by the starting voltage. A maximum current value MAX is determined, said maximum current value representing a current peak of the impressed current. In addition, a first time period T1 is determined, said first time period being representative of the time which has passed between the starting voltage being applied and the maximum current value MAX being reached. Furthermore, a minimum current value MIN is determined, said minimum current value representing a local minimum of the impressed current, wherein the minimum current value MIN follows the maximum current value MAX. A second time period T2 is determined, said second time period being representative of the time which has passed between the starting voltage being applied and the minimum current value MIN being reached. The first time period T1 and the second time period T2 can be used to obtain important information about the valve 20, for example it is possible to determine whether the valve 20 is closing slowly or quickly.

Figure 3B:
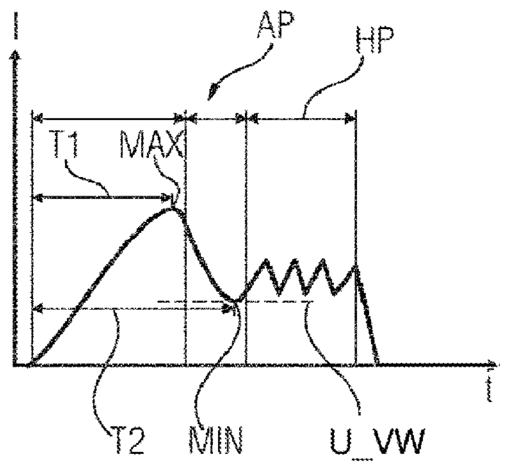
FIG. 3*b* shows a further current profile during control of the valve.
Figure 4B:
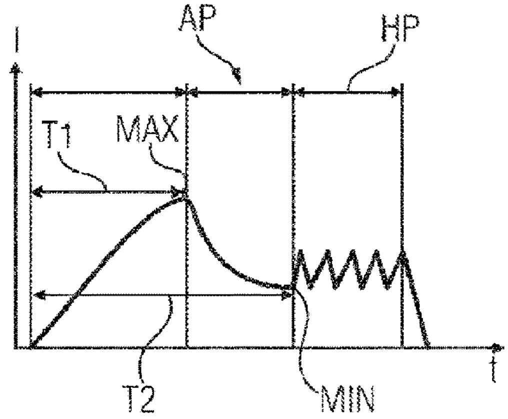
FIG. 4*b* shows a further current profile during control of the valve.

In a predefined second operating mode AP, the predefined starting voltage is applied to the actuator 42 for the first determined time period T1 (FIG. 3*b*, FIG. 4*b*). The second operating mode AP is, for example, an application mode. After the first time period T1 has elapsed and until the end of the second time period T2, the current which is impressed onto the actuator 42 is adjusted by means of a predefined control voltage. The control voltage is adjusted such that the average value of the control voltage is lower than the average value of the starting voltage. By way of example, the control voltage is determined depending on the first time period T1 and/or the second time period T2. By way of example, the control voltage is adjusted depending on the magnitude of the difference between the second time period T2 and the first time period T1 such that it is higher, for example, for a larger magnitude than for a smaller magnitude.

Figure 5:
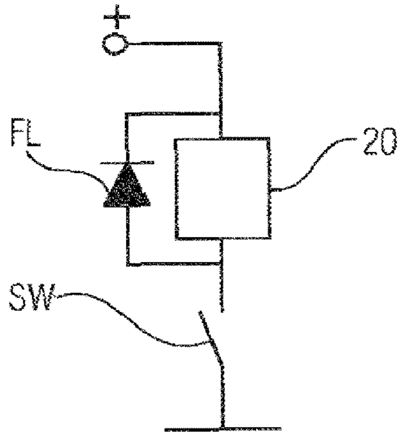
FIG. 5 shows a circuit diagram.

As an alternative or in addition, the control voltage can be adjusted by means of a freewheeling phase, the control voltage being zero in this freewheeling phase and the current being adjusted by a freewheel, such as in FIG. 5 by means of a freewheeling diode FL and a switch SW for example. As an alternative or in addition, it is possible to apply a control voltage of greater than zero to the valve 20, said control voltage being adjusted by means of pulse-width modulation for example. Specifically for slow valves 20, it may be necessary to apply a control voltage of greater than zero.

It is advantageous, after the second time period T2 has elapsed, for the current value to correspond approximately to a predefined lower limit value U_GW. The lower limit value U_GW is, for example, a determined value at which it is ensured that the valve is closed. Therefore, it is possible, for example, for the control voltage to be adjusted such that the current which is impressed onto the actuator 42 drops until it reaches the lower limit value U_GW. By way of example, the current can first be lowered with the freewheeling phase and then with a control voltage greater than zero.

The control voltage is, for example, a pulse-width-modulated voltage. Since the voltage peaks can be just as high as, for example, the starting voltage in the case of pulse-width modulation, the average value of at least one range of the control voltage is relevant in this respect with regard to the resulting actuator force, in order to compare the control voltage with the starting voltage. The same applies if, for example, the starting voltage is pulse-width modulated, and therefore an average value is also relevant in the case of said starting voltage.

A so-called holding mode typically follows after the second time period T2 has elapsed. In the holding mode, it is ensured that the valve 20 is closed and remains closed. To this end, the current is kept at a low level, for example, by means of a two-point controller.

It is possible to reduce the energy consumption by the valve 20 by driving in the second operating mode AP, for example the application mode. Unnecessary heating of the valve 20 can be avoided as a result. The coil service life of the valve 20 may be extended and the CO2 emissions may be reduced in this way. The reduction of power in the period after the first time period has elapsed and until the second time period T2 has elapsed may possibly also ensure that noise is minimized. In addition, information about the closing period of the valve 20 can be determined depending on the first time period T1 and the second time period T2 and precise pump control can be achieved as a result since quick valves 20 may have to be driven by a controller at a later time and/or slower valves 20 may have to be driven by the controller at an earlier time.

In addition, diagnosis, for example of the degree of wear, or analysis of the valve 20 is possible by the first defined operating mode MP. As a result, it is also possible, for example, to possibly extend the first operating mode MP if, for example, a minimum current value MIN was not achieved in the previous time period of the first operating mode MP. A production spread of individual valves 20 can, for example, also be compensated for by targeted driving on account of the determined first time period T1 and second time period T2.

What is claimed is:

1. A method for controlling a valve which has a spring with a spring force and an actuator with an actuator force which counteracts the spring force, the method comprising:

closing the valve in a predefined first operating mode by:

applying a predefined starting voltage to the actuator throughout the course of the first operating mode, determining a maximum current value representing a current peak of a current impressed by the applied starting voltage, determining a first time period representative of a duration between the starting voltage being applied and the maximum current value being reached, determining a minimum current value representing a local minimum of the impressed current, wherein the minimum current value follows the maximum current value, and determining a second time period, said second time period representative of a duration between the starting voltage being applied and the minimum current value being reached while the predefined starting voltage is applied, and closing the valve in a predefined second operating mode by:

applying the predefined starting voltage to the actuator for the determined first time period, and then, after the first time period and until the end of the second time period, using a predefined control voltage to adjust the current impressed onto the actuator, wherein an average value of the predefined control voltage is lower than an average value of the starting voltage.

2. The method of claim 1, wherein the control voltage is determined based on at least one of the determined first time period or the determined second time period.

3. The method of claim 1, wherein the current of the actuator is adjusted by the control voltage such that the current of the actuator corresponds approximately to a predefined lower limit value at the end of the second time period.

4. The method of claim 1, wherein the current is adjusted by a freewheeling phase after the first time period and until the end of the second time period, wherein the control voltage is zero and the current is adjusted by a freewheel in said freewheeling phase.

5. The method of claim 1, wherein the control voltage is adjusted using pulse-width modulation after the first time period and until the end of the second time period.

6. The method of claim 1, wherein the valve comprises an inlet valve of a high-pressure pump.

7. A device for controlling a valve having a spring with a spring force and an actuator having an actuator force that counteracts the spring force, wherein the device is configured to:

determine a maximum current value that represents a current peak of a current which is impressed by an applied starting voltage, determine a first time period that represents a duration between the starting voltage being applied and the maximum current value being reached, determine a minimum current value that represents a local minimum of the impressed current, wherein the minimum current value follows the maximum current value, determine a second time period that represents a duration between the starting voltage being applied and the minimum current value being reached while the applied starting voltage is applied, and apply the predefined starting voltage to the actuator for the determined first time period, and then, after the first time period and until the end of the second time period, use a predefined control voltage to adjust the current impressed onto the actuator, wherein an average value of the control voltage is lower than an average value of the starting voltage.

8. The device of claim 7, wherein the control voltage is determined based on at least one of the determined first time period or the determined second time period.

9. The device of claim 7, wherein the current of the actuator is adjusted by the control voltage such that the current of the actuator corresponds approximately to a predefined lower limit value at the end of the second time period.

10. The device of claim 7, wherein the current is adjusted by a freewheeling phase after the first time period and until the end of the second time period, wherein the control voltage is zero and the current is adjusted by a freewheel in said freewheeling phase.

11. The device of claim 7, wherein the control voltage is adjusted using pulse-width modulation after the first time period and until the end of the second time period.

12. The device of claim 7, wherein the valve comprises an inlet valve of a high-pressure pump.

* * * * *